United States Patent Office 3,567,581
Patented Mar. 2, 1971

3,567,581
URANIUM-SILICON FUEL ELEMENTS FOR
A NUCLEAR REACTOR
Melville Albert Feraday, Deep River, Ontario, Canada, assignor to Atomic Energy of Canada Limited, Ottawa, Ontario, Canada
No Drawing. Continuation-in-part of application Ser. No. 647,246, June 19, 1967. This application June 4, 1968, Ser. No. 734,221
Int. Cl. G21c 3/30
U.S. Cl. 176—70    13 Claims

ABSTRACT OF THE DISCLOSURE

A nuclear reactor fuel element using delta phase ($U_3Si$) uranium-silicon alloy to provide a low aqueous corrosion rate together with low parasitic neutron absorption. The nuclear fuel is provided with a central hollow core or uniformly dispersed porosity or a combination of both having a volume in the range 3–25% of the volume of the core and sheathed width corrosion resistant material.

CROSS-REFERENCE TO RELATED APPLICATION

This application is a continuation-in-part of application Ser. No. 647,246, filed June 19, 1967, now abandoned.

BACKGROUND OF THE INVENTION

This invention relates to a nuclear reactor fuel element having a central core of delta phase ($U_3Si$) uranium-silicon alloy and an outer restraining sheath of zirconium alloy.

One major problem in the design of uranium alloy fuel elements is the poor corrosion resistance of most high uranium alloys when exposed to high temperature water coolant. Because of this poor aqueous corrosion resistance, any defect occurring in the protective sheath surrounding the uranium alloy has severe and undesirable consequences.

Certain uranium-silicon alloys are unique among the homogeneous uranium metal alloys in having a low aqueous corrosion rate and low parasitic neutron absorption and, hence, are particularly suitable for use with high temperature water coolant. Alloys having a composition approaching the delta phase ($U_3Si$) are particularly useful in that the delta phase has the highest uranium density of such intermetallic compounds. The corrosion rate of delta phase ($U_3Si$) uranium-silicon alloy in 295° C. water is about 2 mg./cm.$^2$hr. which is sufficiently low to make its use desirable in the fuel element of the present invention.

Previously the use of uranium-silicon alloys having a composition in the region of the delta phase was restricted because these alloys exhibit undesirable volume instability under irradiation. The swelling in volume, of the order of 4%, is attributable to disordering of the ordered delta phase and/or the break away of bubbles of gaseous fission products from surface tension restraint.

SUMMARY OF THE INVENTION

The invention comprises a nuclear reactor fuel element having a core of uranium metal alloyed with silicon in the range 2–7.3 wt. percent surrounded by a restraining sheath. The core contains void space in the range 3–25% of the alloy either in the form of uniformly dispersed porosity or as a single extended void space. This fuel element permits the use of uranium-silicon alloy fuels having compositions in the region of the delta phase.

DESCRIPTION OF THE PREFERRED EMBODIMENTS

A preferred form of fuel element of this invention includes a central core of uranium alloyed with silicon in the range 2–7.3 wt. percent and heat treated so as to form a corrosion resistant alloy. Preferably, the delta phase, $U_3Si$, is used. The uranium alloy may contain minor additions of other metals such as Al, C, Fe or Cr to total amount of less than 2,000 p.p.m., to reduce swelling caused by irradiation. A void space is formed in the central core having a volume in the range 3–25% of the volume of the uranium-silicon alloy. The size of the void space will vary according to fuel operating limits and the particular application. The preferred value for the void space is 15%. Its purpose is to accommodate any swelling of the uranium alloy and to accommodate any fission products produced.

As an alternative to the use of a central void the fuel element core may have a uniformly dispersed porosity of total amount in the range 3–25%. The porosity serves the same purpose as the central void in accommodating any swelling of the fuel. It has the advantage that, in the event of a sheath defect in the completed fuel element, water is prevented from penetrating to the relatively hot fuel core where corrosion would be more rapid.

Thus the void space can be provided in the alloy core in the form of either a single extended void space or uniformly dispersed porosity and it has been found that the concept of this invention extends to combinations of these two situations, that is a core of uranium-silicon alloy having uniformly dispersed porosity and also defining a single extended void space. In such an embodiment of this invention, using a combination of dispersed porosity and a single extended void space, the total void space has a volume in the range 3–25% of the volume of the uranium-silicon alloy core.

The fuel element is completed by a sheath surrounding the core. The sheath is chosen to provide additional corrosion resistance and restraint so that the swelling of the nuclear fuel is directed inwardly to the void space. The preferred material for the sheath is a corrosion resistant zirconium alloy such as Zircaloy −2, Zircaloy −4 or zirconium −2.5 wt. percent Nb. Some alternative forms of fuel element may instead use stainless steel or aluminum alloy sheaths.

The fuel elements having a central void space may be modified by including a plug of $U_3Si$ welded or brazed to the core to seal the central void in the core. This has the advantage that, in the event of a sheath or end defect in the completed fuel element, water is prevented from penetrating to the relatively hot fuel core.

The following methods are examples of the assembly of the fuel element of this invention:

(1) Individual fabrication of the elements followed by slip fit assembly. In one embodiment of this invention this is accomplished by casting the uranium-silicon alloy in a rod containing a central void and then heat treating the rod at a temperature in the range 750°–900° C. preferably at about 800° C. to transform the alloy peritectoidally to the delta phase ($U_3Si$). The exact temperature of heat treatment varies according to the presence of trace constituents in the alloy. Depending on the initial as-cast structure of the alloy and the extent of completion of the transformation required by the application, this process can be completed in a period ranging from 2 hours to 300 hours, typically about 72 hours. The rod is then formed to its final dimensions for a fuel element core by machining or grinding and the fuel element formed by slip fitting the core into a protective sheath.

(2) A method similar to (1) above except that the uranium-silicon alloy is cast as a billet instead of a rod with a central void. After the heat treatment at about 800° C. as in method (1), the billet is extruded, at a temperature less than the peritectoid temperature of 930° C., into a rod containing a central void. The temperature is maintained less than 930° C. to avoid the reverse reaction which would destroy the delta phase condition of the alloy. As before the rod is then formed to its final dimensions by machining or grinding and the fuel element formed by slip fitting the machined rod or core inside the protective sheath.

(3) A method similar to (2) above except for an inversion of the order in which the heat treatment and extrusion steps are performed. That is, the uranium-silicon alloy is cast as a billet and then extruded into a rod containing a central void. The rod is heat treated at about 800° C., as in method (1), to transform the alloy peritectoidally to the delta phase ($U_3Si$). The rod is then formed to its final dimensions for a fuel element core by machining or grinding and the fuel element formed by slip fitting the core into a protective sheath.

(4) A method having the initial steps set out in (2) above. That is, casting the uranium-silicon alloy as a billet and heat treating the billet at about 800° C., as in method (1). The heat treated billet is then coextruded inside a zirconium alloy shell at a temperature less than 930° C. to form the fuel element consisting of a core of delta phase uranium-silicon ($U_3Si$) having a central void and clad in and bonded to a zirconium alloy sheath.

(5) A method similar to (4) above except for an inversion of the order in which the heat treatment and coextrusion steps are performed. That is, the uranium silicon alloy is cast as a billet and then coextruded inside a zirconium alloy shell to form a fuel element in which the core has a central void and is clad in and bonded to a zirconium alloy sheath. The fuel element assembly is then heat treated at about 800° C., as in method (1), to transform the uranium-silicon alloy core to the delta phase ($U_3Si$).

(6) A method comprising the step of casting the uranium-silicon alloy as a rod having uniformly dispersed porosity of total amount in the range 3–25% of the volume of the rod. The uranium-silicon alloy rod having uniformly dispersed porosity may be produced by the introduction of a suitable inert gas, such as helium, into the molten charge. This may be achieved by bubbling the gas through the molten alloy. On solidification of the alloy, gas is trapped in the alloy in the form of spherical, closed pores. It has also been found that if the molten alloy, typically at 1500° C., is exposed to an atmosphere of the inert gas sufficient gas is absorbed to produce the desired porosity on solidification.

Alternatively, the gas may be introduced into the molten alloy by placing a gas-generating liquid or solid in the mould cavity in which the core is to be formed. Magnesium metal has been found suitable for this purpose. When the gas-generating liquid or solid is brought into contact with the molten alloy, gas is formed which disperses through the alloy and, as before, is trapped in the alloy during solidification forming generally spherical closed pores.

The rod is then heat treated at about 800° C. as previously described in method (1), to transform the alloy peritectoidally to the delta phase ($U_3Si$). The rod is then formed to its final dimensions for a fuel element core by machining or grinding and the fuel element formed by slip fitting the core into a protective sheath.

The following examples are illustrative of the properties of the fuel element of this invention.

EXAMPLE 1

Using the method set out at (1) above including the step of casting, several samples of fuel elements in accordance with this invention were prepared using the delta phase, $U_3Si$. The central core dimensions were 13 cm. long, 1.4 cm. diameter, void space 7%. The sheath was formed from Zircaloy —2 having a thickness of 0.063 cm. The overall can diameter was thus, approximately, 1.5 cm.

These samples were irradiated and it was found possible to obtain a total power output in excess of 10,000 mwd./teU without exceeding an external diameter increase of 1%. Thus the fuel element of this invention can be used to a high burnup without distortion.

EXAMPLE 2

Fuel element samples identical to those described in the preceding example had defects formed in their sheathing and were corrosion tested in 300° C. water. The fuel element diameter increased at a rate of 0.0002 cm./hour up to about 140 hours, thereafter the rate decreased to 0.00007 cm./hour. Thus the aqueous corrosion resistance of the assembled fuel element is sufficiently high for use in reactors having high temperature water coolant.

Thus, there has been described a nuclear reactor fuel element using uranium-silicon alloy and suitable for use in reactors having high temperature water coolant.

Six methods of assembling the fuel element have been described; other methods will be apparent to those skilled in the art.

I claim:
1. A nuclear reactor fuel element comprising,
   a core of uranium metal alloyed with silicon in the range of 2–7.3 wt. percent; said core defining a void space therein, and
   a sheath surrounding said core formed from corrosion resistant zirconium alloy,
   the volume of said void space being in the range 3–25% of the volume of the uranium alloy and said core having been heat treated to form a corrosion resistant alloy.
2. A nuclear reactor fuel element as defined in claim 1 wherein the uranium-silicon alloy is the delta phase $U_3Si$.
3. A nuclear reactor fuel element as defined in claim 2 wherein the volume of said void space is 15% of the volume of the uranium alloy.
4. A nuclear reactor fuel element as defined in claim 1 wherein said uranium alloy contains up to a total of 2000 p.p.m. of elements selected from the groups Al, C, Fe and Cr.
5. A nuclear reactor fuel element as defined in claim 3 wherein said alloy contains up to a total of 2000 p.p.m. of elements selected from the group Al, C, Fe and Cr.
6. A nuclear reactor fuel element, as defined in claim 1 further comprising a plug of said uranium-silicon alloy bonded to the ends of said core to seal said void space.
7. A nuclear reactor fuel element comprising,
   a core of uranium metal alloyed with silicon in the range of 2–7.3 wt. percent; said core defining at least one void space therein, and
   a sheath surrounding said core formed from corrosion resistant alloy,
   the total volume of all void spaces in said core being in the range 3–25% of the volume of the uranium alloy and said core having been heat treated to form a corrosion resistant alloy.
8. A nuclear reactor fuel element as defined in claim 7 wherein the uranium-silicon alloy is the delta phase $U_3Si$.
9. A nuclear reactor fuel element as defined in claim 7 wherein the total volume of all void spaces in the core is 15% of the volume of the uranium alloy.
10. A nuclear reactor fuel element as defined in claim 7 wherein said uranium alloy contains up to a total of 2000 p.p.m. of elements selected from the groups Al, C, Fe and Cr.
11. A nuclear reactor fuel element comprising,
    a core of uranium metal alloyed with silicon in the range 2–7.3 wt. percent, said core having a uniformly dispersed porosity of total amount in the range 3–25% and a sheath surrounding said core formed from corrosion resistant zirconium alloy, said core having been heat treated to form a corrosion resistant alloy.

12. A nuclear reactor fuel element as defined in claim 11 wherein the uranium-silicon alloy is the delta phase $U_3Si$.

13. A nuclear reactor fuel element as defined in claim 11 wherein said uranium alloy contains up to a total of 2000 p.p.m. of elements selected from the groups Al, C, Fe and Cr.

References Cited

UNITED STATES PATENTS

| | | | |
|---|---|---|---|
| 2,731,341 | 1/1956 | Kaufmann | 75—122.7 |
| 2,898,252 | 8/1959 | Zegler | 75—122.7X |
| 3,325,375 | 6/1967 | Mogard | 176—67 |
| 3,331,748 | 7/1967 | Feraday | 176—70 |

CARL D. QUARFORTH, Primary Examiner

G. SOLYST, Assistant Examiner

U.S. Cl. X.R.

176—89; 75—122.7